United States Patent [19]
Frisch, deceased et al.

[11] 3,977,940

[45] Aug. 31, 1976

[54] EMERGENCY COOLING SYSTEM FOR NUCLEAR REACTORS

[75] Inventors: Erling Frisch, deceased, late of Pittsburgh, Pa., by Dorothy Randall Frisch, administratrix; Harry N. Andrews, Franklin Township, Westmoreland County, Pa.

[73] Assignee: Westinghouse Electric Corporation, Pittsburgh, Pa.

[22] Filed: July 23, 1974

[21] Appl. No.: 491,077

Related U.S. Application Data

[63] Continuation of Ser. No. 259,327, June 2, 1972, abandoned.

[52] U.S. Cl. ................................ 176/38; 176/87; 176/19 R; 285/9 R; 285/375
[51] Int. Cl.² .......................................... G21C 9/00
[58] Field of Search ............. 176/37, 38, 87, 86 R, 176/61, 64, 54, 65, 19; 285/9 R, 375

[56] References Cited
UNITED STATES PATENTS

| 2,926,127 | 2/1960 | McCorkle | 176/65 |
|---|---|---|---|
| 3,346,459 | 10/1967 | Prince et al. | 176/61 |
| 3,354,040 | 11/1967 | Frame et al. | 176/19 |
| 3,357,891 | 12/1967 | Wadmark | 176/64 |
| 3,481,832 | 12/1969 | Rickert | 176/78 |

FOREIGN PATENTS OR APPLICATIONS

| 291,909 | 5/1967 | Australia | 176/38 |
|---|---|---|---|
| 258,408 | 12/1911 | Germany | 285/9 R |
| 1,214,314 | 12/1970 | United Kingdom | 176/61 |
| 178,251 | 6/1966 | U.S.S.R. | 285/9 R |

*Primary Examiner*—Harvey E. Behrend
*Attorney, Agent, or Firm*—J. R. Campbell

[57] ABSTRACT

Upon the occasion of loss of coolant in a nuclear reactor as when a coolant supply or return line breaks, or both lines break, borated liquid coolant from an emergency source is supplied in an amount to absorb heat being generated in the reactor even after the control rods have been inserted. The liquid coolant flows from pressurized storage vessels outside the reactor to an internal manifold from which it is distributed to unused control rod guide thimbles in the reactor fuel assemblies. Since the guide thimbles are mounted at predetermined positions relative to heat generating fuel elements in the fuel assemblies, holes bored at selected locations in the guide thimble walls, sprays the coolant against the reactor fuel elements which continue to dissipate heat but at a reduced level. The cooling water evaporates upon contacting the fuel rods thereby removing the maximum amount of heat (970 BTU per pound of water) and after heat absorption will leave the reactor in the form of steam through the break which is the cause of the accident to help assure immediate core cooldown.

9 Claims, 13 Drawing Figures

EMERGENCY COOLING SYSTEM FOR NUCLEAR REACTORS

This is a continuation of application Ser. No. 259,327 filed June 2, 1972, now abandoned.

BACKGROUND OF THE INVENTION

The invention described herein relates to nuclear reactors and more particularly to an in-core emergency cooling system used to carry away heat generated in a reactor core in the event a major rupture occurs in the reactor main cooling system.

A nuclear reactor generally comprises a pressure vessel enclosing a reactor core. The core contains multiple fuel assemblies all of which include heat generating fissionable fuel elements while a certain number are provided with control rods movable in guide thimbles interspersed among the fuel elements. The degree of insertion of the control rods in the fuel assemblies determines and controls the amount of heat generated by the fuel elements. A liquid coolant circulated through the reactor core under high pressure, absorbs the generated heat and the thus heated coolant is then supplied to a steam generator which produces steam to power a steam turbine.

In the unlikely event of loss of liquid coolant resulting from rupture of a coolant supply or discharge pipe, the control rods mounted in the fuel assembly are automatically inserted to substantially stop the fission process. However, the residual heat in each fuel element or rod would be of a magnitude sufficient to adversely affect or severely damage the reactor core unless provision were made to positively effect its removal.

In recognition of this potential problem, the general design criteria established by the Atomic Energy Commission for the design and performance of nuclear reactors, requires that an emergency cooling system be coupled to each nuclear reactor to supply coolant thereto under conditions of a major break in the reactor main cooling piping and the consequent loss of coolant to the reactor components. All currently operational reactors therefore contain emergency cooling systems and in one well known design, large pressurized accumulators containing the needed emergency coolant, automatically discharges highly concentrated borated water into the reactor cooling system when the reactor system pressure drops below a certain pressure which indicates a major break in the piping. The emergency water is injected into the coolant inlet piping near the reactor inlet nozzles to assure direct delivery into the reactor core in need of a coolant liquid. This known system provides all the safeguards necessary if the major break occurs in an outlet pipe. However, some concern has been expressed as to the adequacy of this cooling system if the break occurs in one of the inlet pipes.

Because of this uncertainty, consideration has been given to an improved system which will positively supply coolant to the reactor core regardless of the location of a break in the main coolant system.

SUMMARY OF THE INVENTION

Briefly stated, this invention provides an improved in-core injection emergency cooling system of superior capability than prior art systems and which includes system components capable of supplying liquid coolant from an emergency source to a nuclear reactor core for cooling purposes. The coolant is distributed to members in the reactor core which project the liquid coolant directly into contact with the heat producing fuel elements for absorbing the residual heat after the fission process has been substantially terminated.

An object of the invention therefore is to provide an improved in-core emergency injection cooling system which will positively assure delivery of emergency coolant to a reactor core in the event of rupture of the main coolant piping.

Another object of the invention is the provision of an emergency cooling system which sprays water directly against heat generating fuel elements in a reactor fuel assembly for absorbing heat remaining after the fission process is essentially stopped.

Still another object of the invention is to utilize control rod guide thimbles which are part of each fuel assembly to supply coolant from an emergency source to a reactor fuel assembly for cooling purposes.

The subject matter of this invention is particularly pointed out and distinctly claimed in the concluding portion of this specification. The invention however both as to organization and method of operation, together with further objects and advantages thereof, may best be understood by reference to the following description taken in conjunction with the accompanying drawings wherein:

DESCRIPTION OF THE PREFERRED EMBODIMENT

Figure 1:
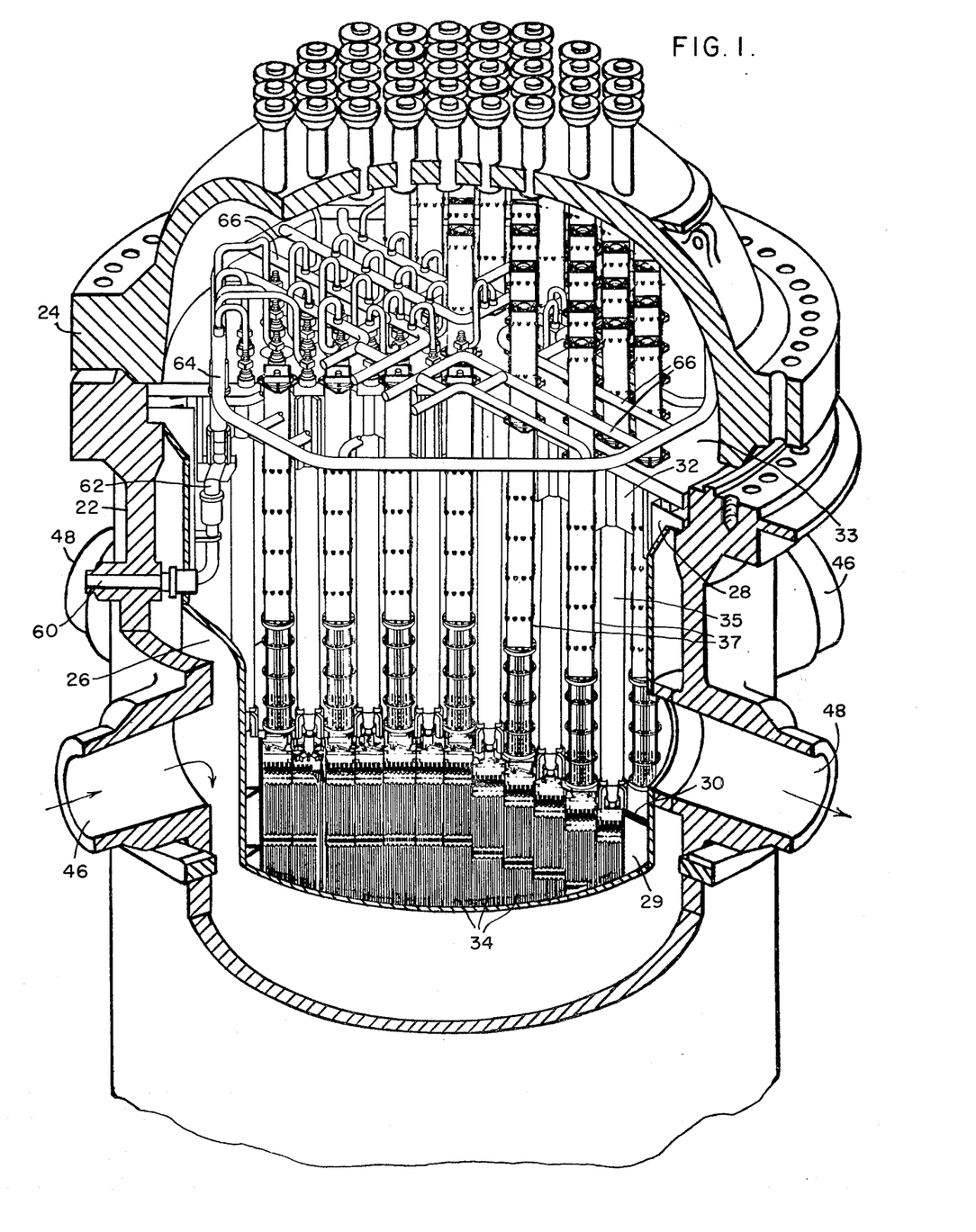
FIG. 1 is a view in elevation, partly in section, illustrating application of the invention to a nuclear reactor.

Referring now to the drawings wherein like reference characters designate like or corresponding parts throughout the several views, there is shown in FIG. 1, a nuclear reactor of conventional design generally consisting of a pressure vessel 22 and a cover or closure head 24 secured to the pressure vessel by bolts not shown or other securing means. A core barrel 26 hung on the pressure vessel walls by a flange 28 supports the reactor core 29. The core is comprised of multiple fuel assemblies 34 disposed between an upper core plate 30 and a lower core plate, not shown, in a conventional manner. A deep beam structure 33 having flanges 32 surmounts the core barrel 26 and is connected to the upper core plate 30 by a number of heavy walled tubes or cylinders 35. The structure 33 serves the additional purpose of laterally supporting control rod guide tubes 37. It will be apparent to those skilled in the art that FIG. 1 only generally illustrates the components in a reactor and is presented to show how the structure of the present invention is incorporated therein.

Figure 1A:
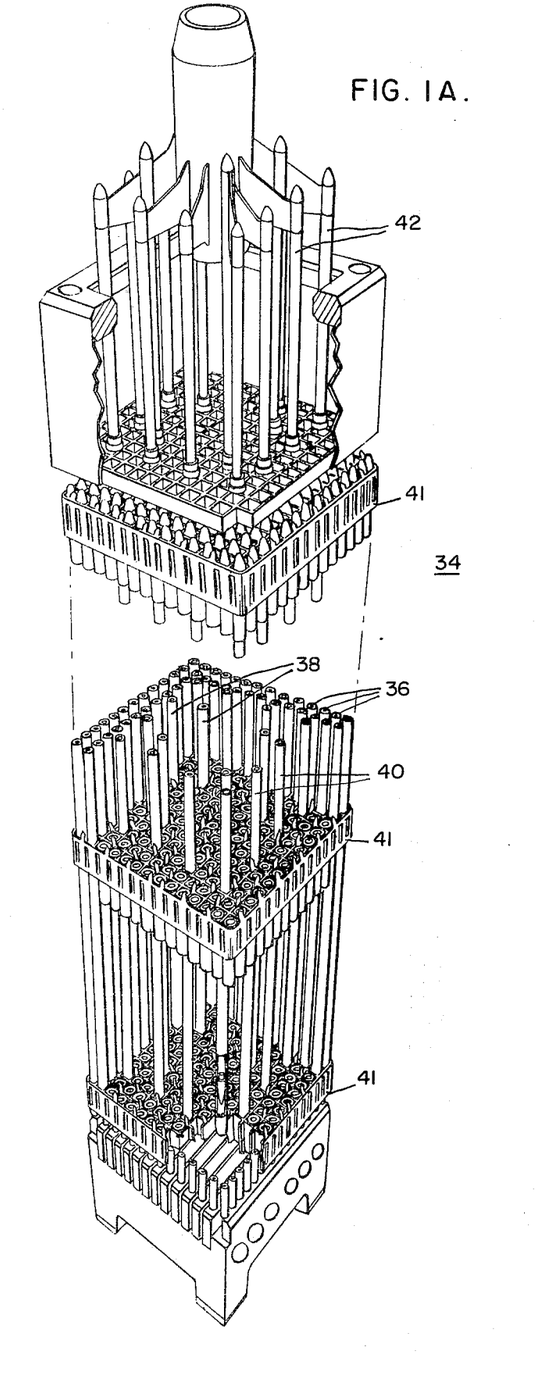
FIG. 1A is an isometric showing of a fuel assembly used in the reactor of FIG. 1.

It also will be understood that about 200 fuel assemblies 34 are installed within the reactor pressure vessel although this number obviously may vary depending on reactor size. As in conventional constructions, each fuel assembly 34 comprises a multiplicity of fuel elements 36, FIG. 1A, and control rod guide thimbles 40 supported in grids 41 spaced along the fuel assembly length in a well known manner. Control rods 42 are movable vertically in thimbles 40 for capturing neutrons during reactor operation. Control rod drive mechanisms, not shown, mounted above reactor closure head 24, operate the movable control rods. Since some of the fuel assemblies do not require control rods, other guide thimbles 38 of the same size and configuration are nevertheless included in the fuel assemblies not actually containing control rods. The ends thereof are blocked by plugs 44, FIG. 7B, to prevent by-pass flow of coolant from the bottom to the top of the reactor core.

To obtain the benefits of the heat generated during the fission process in the reactor, liquid coolant is introduced through inlet 46, FIG. 1 and flows downwardly between the outside surfaces of the core barrel 26 and the inner surfaces of the pressure vessel 22 and into a cavity located in the bottom of the reactor. The liquid, under high pressure, flows through openings provided in the bottom of the barrel, then upwardly through similar openings in the lower core plate and into contact with fuel elements 36 in each fuel assembly. The coolant thereupon absorbs heat generated during the fission process and rises in temperature prior to flowing through the outlet 48 to steam generators.

As indicated above, each nuclear reactor must be equipped with an emergency cooling system in addition to the main cooling system, to prevent damage to the fuel elements in the event a major rupture occurs in the reactor main cooling piping. Such requirements are completely met by the present invention by withdrawing borated water from an external emergency source, for example, pressurized accumulators, and supplying it through a separate piping system directly into the core region. Generally speaking, upon entering the reactor, the water is distributed to the control rod guide thimbles in those fuel assemblies without control rods. These thimbles are provided with small outlet holes along their length through which the water is discharged in the form of a spray against the heat dissipating fuel rods. By concentrating the water spray to specifically defined areas where cooling is required, it is possible to obtain nearly uniform cooling of the entire core region while actually decreasing the quantity of flow required in prior systems. It should be pointed out that the cooling water gradually evaporates when contacting the fuel rod cladding and leaves the piping break in the form of steam which accounts for the high cooling efficiency. As in presently installed reactors, safety injection pumps and residual heat removal pumps are still required in addition to the above-described emergency cooling system. These pumps and the systems in which they are located serve to recirculate coolant through the reactor for extended time periods but such systems do not comprise a part of this invention.

Figures 4, 5, 6:
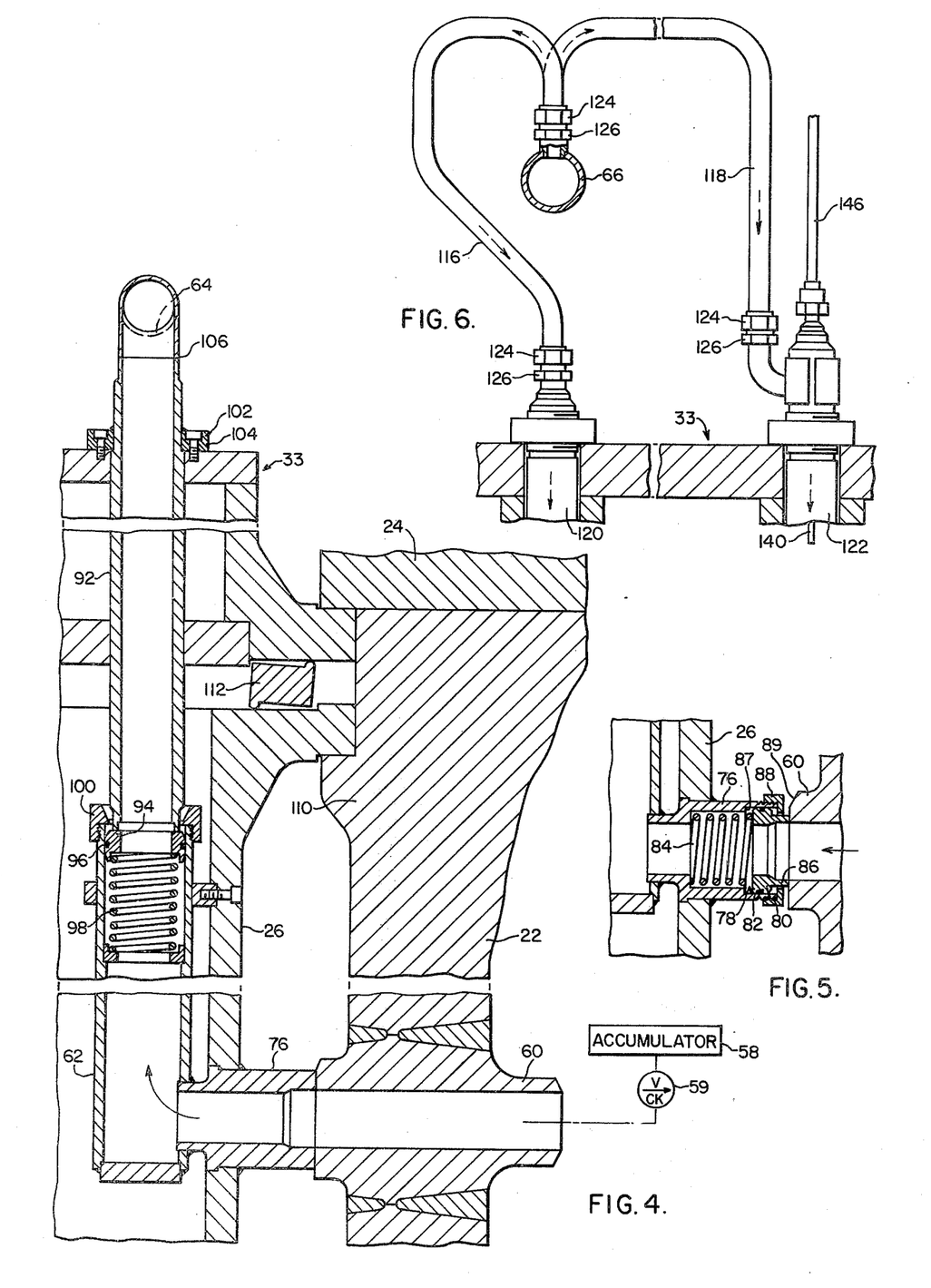
FIG. 4 is a view taken on lines IV—IV of FIG. 2 illustrating the arrangement for introducing emergency cooling water into the reactor.
FIG. 5 is a design of a seal ring adapted for use with the auxiliary nozzle illustrated at the bottom of FIG. 4.
FIG. 6 is a view taken on lines VI—VI of FIG. 2 showing the arrangement of pipes used for transferring coolant from a manifold to the reactor core.

Referring more specifically to the emergency cooling system, FIGS. 1 to 6 illustrate the structure and the piping arrangements used for suplying the emergency cooling liquid from accumulators 58 and normally open check valves 59 to the top of a reactor prior to introducing it into the core of the reactor for cooling purposes. The particular arrangement used for initiating operation of the safety system and delivering emergency coolant to the reactor is disclosed in U.S. Pat. No. 3,528,884, Collier et al, assigned to the same assignee as this invention. FIGS. 1 and 4 show one of four emergency coolant inlets 60 attached to the side walls of pressure vessel 22. One accumulator usually serves each inlet 60. The inlets 60 should be located as close as possible to the reactor vessel head flange and preferably, midway between each pair of main inlet and outlet nozzles. The emergency coolant ascends through risers 62 to the top of the reactor and is delivered to a ring shaped manifold pipe 64 mounted on the deep beam structure 33. Branch lines 66 extend inwardly to supply the coolant to downcomers as more fully described hereafter.

Figures 2, 3:
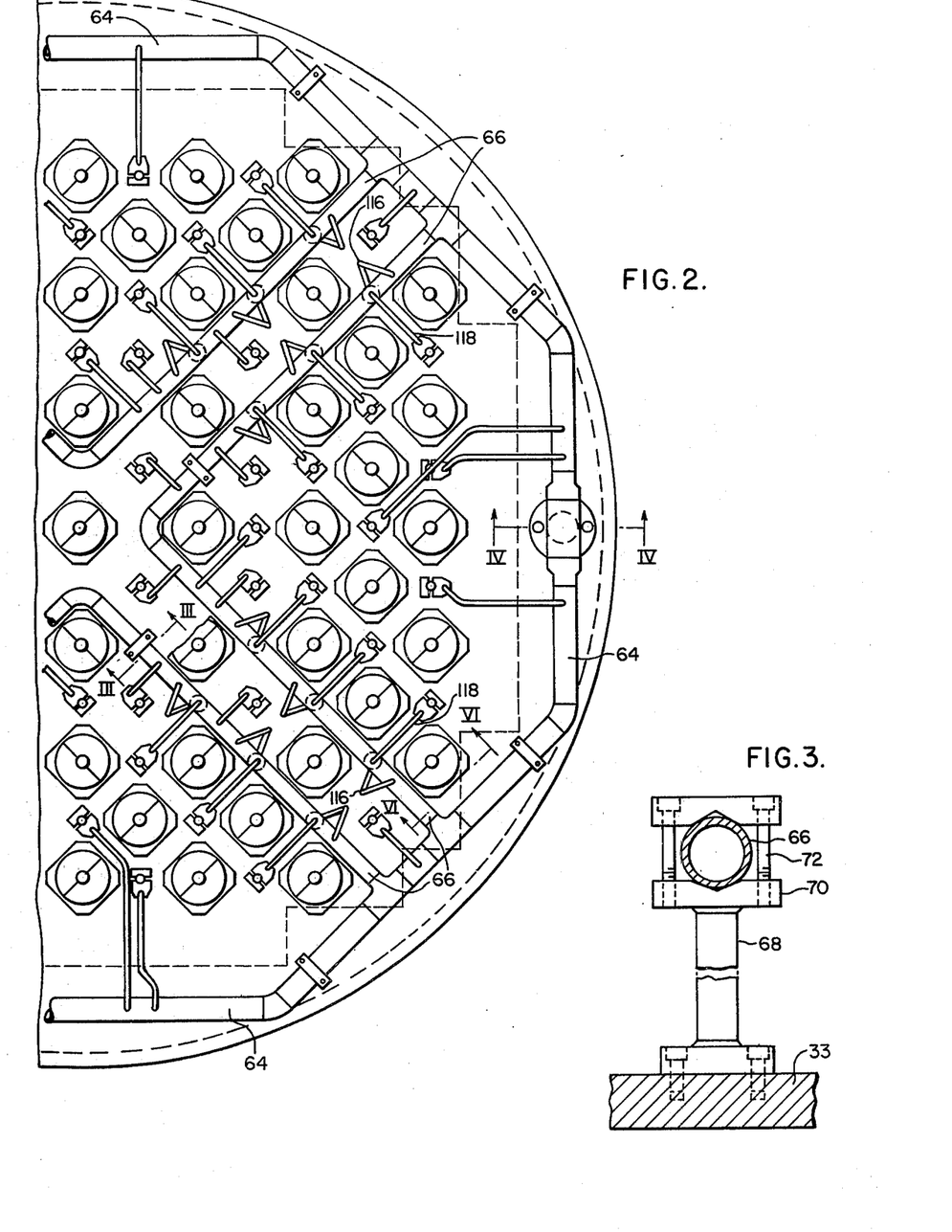
FIG. 2 is a plan view partially showing the top surface of the reactor of FIG. 1 with the cover removed.
FIG. 3 is a view taken on lines III—III of FIG. 2 showing an arrangement for mounting the coolant piping on the upper support plate.

FIG. 2 illustrates a multiplicity of pipes of varying sizes and location connected to the main manifold 64. To facilitate the installation of the piping system, it is recommended that the manifold 64 including branch lines 66 and the required adaptors 126, FIG. 6, for the individual supply lines 116 be completely manufactured at a separate location and installed on the deep beam structure 33 as a unit. As shown in FIG. 3, the manifold piping system is secured to the deep beam structure 33 by brackets 68, cross bars 70 and bolts 72. The small individual supply lines are cut, shaped and installed after the manifold is secured in place.

As shown in FIG. 4, the inlet nozzle 60 is preferably welded to the pressure vessel walls and its inner end engages an auxiliary nozzle 76 extending through and separately welded to the core barrel walls 26. To obtain a satisfactory seal between the nozzles, the abutting surfaces are cylindrical around the center lines of the barrel and the pressure vessel, respectively. Since the coefficient of thermal expansion for the stainless steel barrel is higher by 50% than that of the carbon steel pressure vessel, a slight clearance is provided between the surface at room temperature to permit insertion of the barrel in the vessel without interference. As the temperature rises, the clearance decreases thus providing a non-leaking interference fit that is obtained at operating temperature.

With this design the sealing surfaces will separate when emergency cooling water is introduced and cause a slight loss of water by leakage. To preclude such leakage, the seal arrangement of FIG. 5 is used. As shown, the inside diameter of the auxiliary nozzle 76 is increased at 78 to accommodate a seal ring or piston 80 having a piston ring 82 which is arranged for movement axially in the nozzle 76. A spring 84 forces extension 86 on the end of the seal ring into engagement with the inlet nozzle 60. To assure optimum sealing conditions, the seal ring extension and inlet nozzle surfaces are ground flat to thereby reduce any leakage past the seal ring. Retaining ring 88 threaded on an end of auxiliary nozzle 76 limits outward movement of the seal ring 80. To facilitate assembly of core barrel 26, with installed nozzle 76 of FIG. 5, in the pressure vessel, the upper side of inlet nozzle 60 is equipped with a beveled portion 89, the arrangement being such that as the barrel is lowered into position, the end of extension 86 slides down bevel 89 to the final position shown in FIG. 5. With this arrangment, the coacting nozzle surfaces help assure a seal not susceptible of leakage as the parts move in response to thermal changes during reactor operation. Surface 87 limits inward movement of seal ring 80 during assembly and under spring failure conditions thereby controlling the maximum bypass flow.

To convey the emergency coolant from inlet 60 to the manifold 64, the closed bottom tube riser 62 is welded near its base to the auxiliary nozzle 76 while its upper end connects with tube sections 92 of riser 62 which terminates in the manifold 64. A seal ring 94, similar in design to seal ring 80, is mounted in the upper end of riser 62 for also facilitating assembly and for minimizing leakage at the joint. It includes a piston ring 96 which is urged into engagement with the bottom surface of tube section 92. Retaining ring 100 limits outward displacement of the seal ring. Convenience in assembly is achieved by welding the auxiliary nozzle 76 to the core barrel 26 preferably after the complete unit consisting of the auxiliary nozzle 76, riser 62, seal ring 94 and spring 98 is completely assembled. The tube section 92 extends through and is attached to the deep beam structure 33 by a flange 102 and bolts 104. Its upper end is welded to a tee 106 which forms a part of manifold 64.

Upon initial assembly of the parts or after a refueling operation, the lower end of tube section 92 which is carefully machined, contacts seal ring 94 and displaces it downward a short distance to compress the spring and thereby produce the necessary sealing force. The seal ring is sufficiently short to permit a small amount of tilting to obtain alignment with the contacting surface of tube section 92 without causing binding within the cylindrical surface of the riser.

Since it is necessary that alignment be maintained between the parts, the relative position of the deep beam structure 33 and the core barrel 26 is established by capturing the flanges of these units between the closure head 24 and the reactor pressure vessel 22. The required sealing forces on the flanges is produced by compression of a heavy Belleville spring 112 located between the flanges.

Referring to FIGS. 1, 2 and particularly 6, the cooling water flows from the manifold 64 into sub-manifold or branch lines 66, and from there, through a multiplicity of small diameter tubes 116 and 118 which connect respectively with multiple downcomers 120 and 122 mounted in the deep beam structure 33. The downcomers 120 serve to carry cooling water only while each downcomer 122 also serve the additional function of internally supporting a thermocouple 140 which measure the temperature of the reactor coolant at its point of exit from selected fuel assemblies during reactor normal operation. The downcomers are connected to deep beam structure 33 by Swagelok or similar fittings 124 and adapters 126. In the reactor design chosen to illustrate the invention, 84 downcomers are used but this number may be varied to suit different designs of reactors. The downcomers connect with unused control rod guide thimbles in each fuel assembly as described hereafter.

Figure 7A:
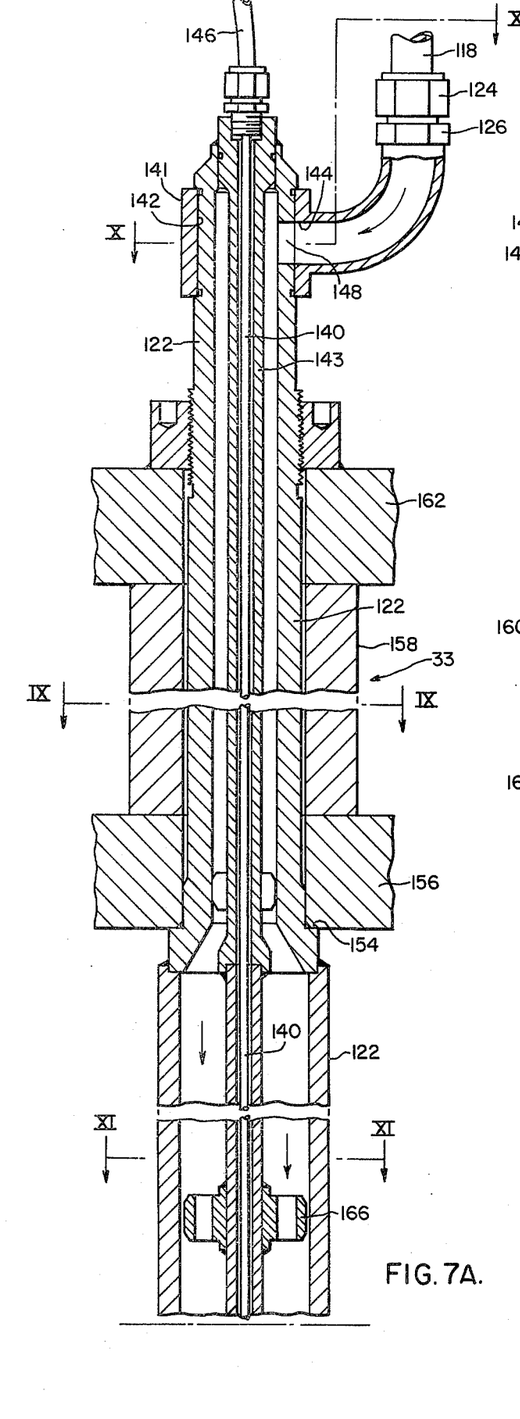
FIGS. 7A and 7B when joined together show the design of a downcomer and further includes the arrangement for introducing a coolant medium into a fuel assembly located in the reactor.
Figures 7B, 8:
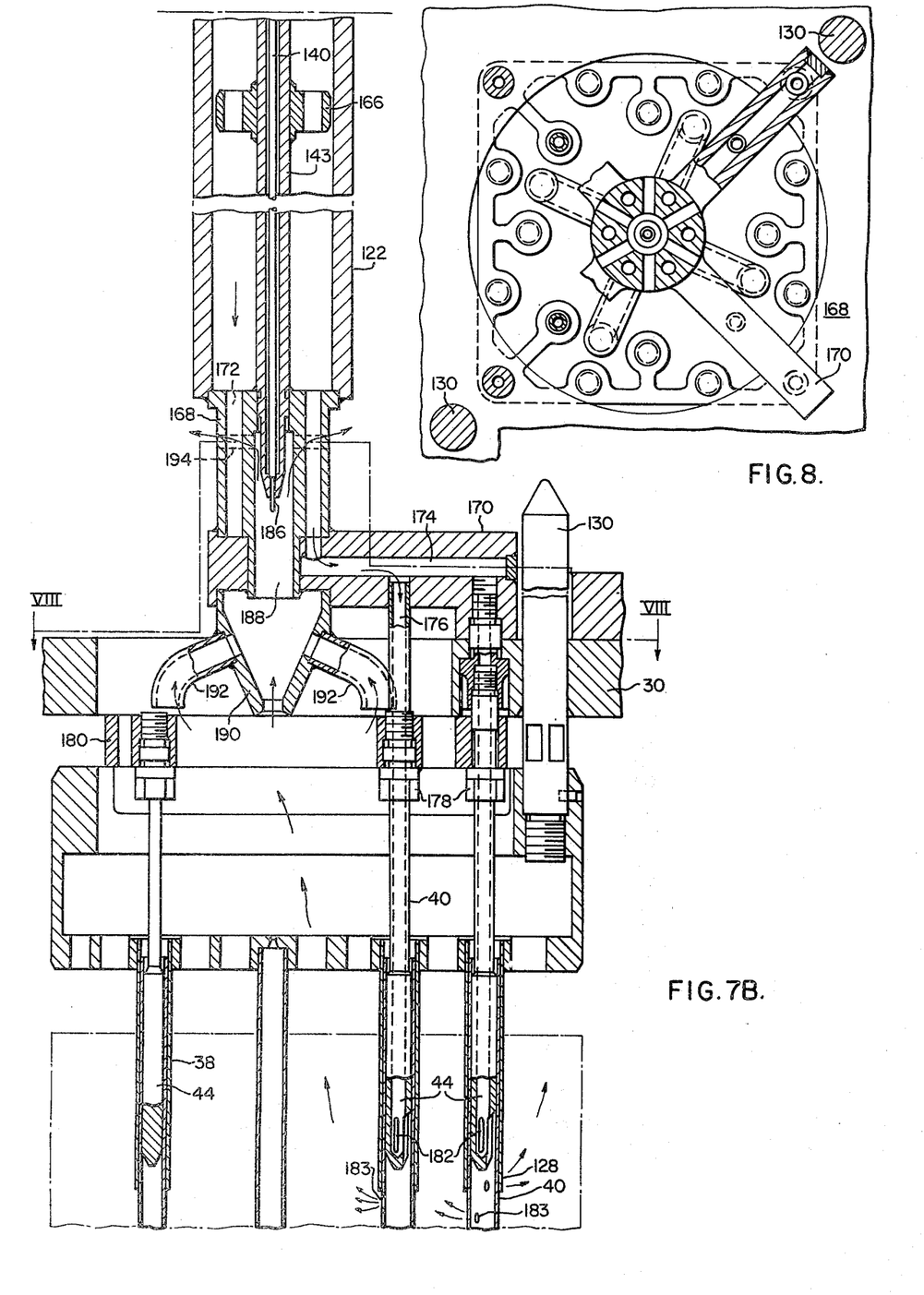
FIG. 8 is a view taken on lines VIII—VIII of FIG. 7B illustrating a portion of the emergency coolant inlet and the outlet.
Figure 9:
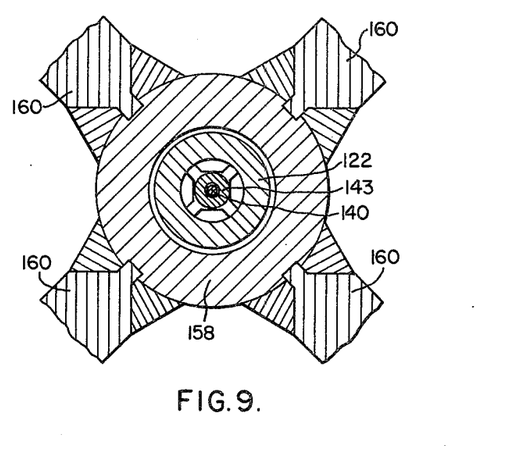
FIG. 9 is a view taken on lines IX—IX of FIG. 7A.

The design of the downcomers and their hydraulic connections to the guide thimbles 38 located in each fuel assembly not containing control rods, are shown in FIGS. 7A through 11. It will be understood that a number of fuel assemblies comprise each reactor with each fuel assembly consisting of a multiplicity of fuel elements and guide thimbles containing control rods. Other fuel assemblies contain only guide thimbles and fuel elements as indicated above. In conventional constructions, selected guide thimbles receive control rods which control reactor operation while the other remaining unused guide thimbles are closed by plugs at their upper ends. A standard fuel assembly which does not include control rods, contains about 20 guide thimbles of which only eight, shown on the diagonals in FIG. 8 are used for the emergency cooling system. It should be noted that other numbers of thimbles could be used. Each fuel assembly is accurately positioned relative to the upper core support plate 30 by a pair of alignment pins 130 attached to the top nozzle by threading.

Figure 10:
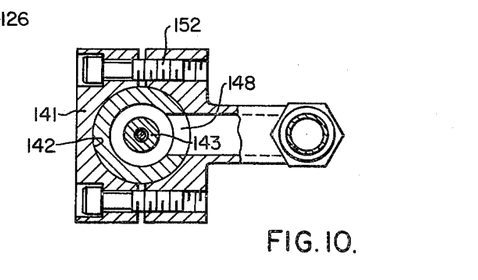
FIG. 10 is a view taken on lines X—X of FIG. 7A showing the design of a clamp for securing coolant inlet piping to a downcomer.
Figure 11:
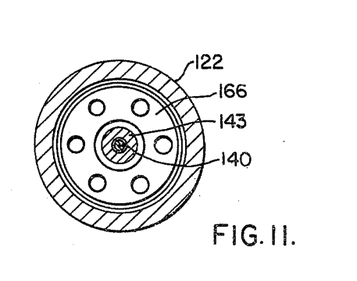
FIG. 11 is a view taken on lines XI—XI of FIG. 7A.

FIGS. 6 and 7A illustrate the arrangement for supplying emergency water from manifold 64 to the guide thimbles 38 of a single fuel assembly. As previously mentioned, the downcomer 122 not only provides an avenue for the flow of emergency water to the reactor but also provides access to the reactor by a thermocouple 140. Because of this the downcomer inlet is modified to accommodate the thermocouple. As shown in the top of FIG. 7A and FIG. 10, a block 141 having openings 142 receives appropriate fittings and adapters for thermocouple tubing 146. Opening 144 receives emergency water tubing 118. Radial hole 148 establishes water communication between tubing 118 and downcomer 122. The block is attached to the downcomer by clamps formed by block 141 and bolts 152. In those instances where downcomers do not contain thermocouples, the emergency water inlet tubes 116 are connected directly to the downcomer 120, as illustrated in FIG. 6.

Since the downcomers will be subjected to relatively heavy upward thrust forces under certain operating conditions, the upper portion of each downcomer is equipped with a flange-like projection 154 which bears against the bottom portion 156 of deep beam structure 33. The downcomers 120 and 122 are secured to the upper part 162 of deep beam structure 33 which includes a heavy flanged ring 158 welded to a network of vertical reinforced ribs 160 and the heavy plates 156 and 162. Where the downcomer penetrates the structure at a rib reinforcement location, a heavy tubular section of the downcomer is welded to the rib structure.

It will be noted that near the bottom of FIG. 7A, the downcomer assumes a larger internal diameter and as illustrated in FIG. 7B, spacers 166 having water flow openings therein support the thermocouple 140 and guide tube 143 in spaced relationship with the downcomer inner walls.

As illustrated in FIG. 7B and FIG. 8, the lower end of the downcomer consists of a distributor 168 connected to a cross-shaped support base 170 by welding. The distributor and four arms of the base 170 contain aligned emergency water supply ducts 172 and 174 which communicate with passageways 176 bored in guide thimbles plugs 44 which normally plug the guide thimbles. The plugs in the four corner guide thimbles are attached by threading to the support base 170 and therefore serve to support it as well as plug frame 180 on the lower core plate 30.

Each of the eight water transmitting plugs is of the design shown and includes the passageway 176 and a radial hole 182 at the point of reduced diameter near the end of the plug from which emergency water is discharged into the guide thimbles. The guide thimbles are equipped with radial holes 183 spaced along their length, such holes being oriented in a direction to spray the emergency coolant radially into the core at numbers of elevations. This water also flows into the fuel assembly through the space between the plug and the inner walls of guide thimbles near the top. To achieve the desired degree of cooling, each of the eight tubes in each assembly used for emergency cooling purposes, has about twelve to fifteen holes per tube and about 100 fuel assemblies containing the emergency cooling features thus providing about twelve thousand jets through which the coolant is sprayed into the reactor core.

To facilitate the entrance of plugs 44 into the guide thimbles when the upper portion of the reactor is lowered into the pressure vessel, the lower tip of each plug is tapered to correct for slight misalignment between the plugs and thimbles. The plug is flexible and accommodates slight radial displacements on the plug body.

Modern pressurized water reactors utilize a large number of thermocouples for measuring the coolant water temperature at the outlet of selected fuel assemblies. The thermocouple wires (⅛ inch OD) usually are supported in small diameter guide tubes located in a position directly above the selected fuel assemblies. Because of the high velocity and turbulence of coolant in the upper portion of the reactor during normal operation, the guide tubes must be carefully supported to prevent damage. Installation of the tubes is a difficult task involving great time and effort. To overcome this serious disadvantage in known designs, the guide tube housing the thermocouple is combined with the emergency cooling downcomers before installation so that no additional work of supporting the guide tubes is required during or after the installation process. Thermocouple 140 for the fuel assembly shown is enclosed in a heavy wall guide tube 143. As indicated previously, the thermocouple guide tube is held in spaced relationship with the downcomer by spacers 166 equipped with axially extending openings through which the emergency cooling water flows. The lower end of the thermocouple guide tubing is welded to the distributor 168 before the downcomer tubing is slipped over the assembly and attached by welding. The tip of the thermocouple 186 is not influenced by the temperature of water flowing through the passageways 172 since it is located in the thermocouple chamber 188.

It is important that the thermocouple accurately sense the average temperature of the cooling water being discharged from the fuel assembly. To accomplish this on earlier reactor designs, it was customary to mount stationary mixing vanes on the fuel assemblies or on the core plate directly above the fuel assemblies to achieve mixing. Such constructions added considerably to the reactor cost. This disadvantage is overcome in the present invention by providing a mixing cup 190 welded to the underside of support base 170. The mixing cup is equipped with four short pipe sections 192 and a center hole through which samples of cooling water flow from the center and four quadrants of the fuel assembly on its path to the water discharge outlets 194. It should be recognized that only a small percentage of the total fuel assembly water passes through these passages. Since the emergency coolant inlet structure is permanently installed in the reactor, this structure is therefore utilized to contain the thermocouples which are used to primarily monitor coolant temperature when the reactor is operating under normal conditions.

In operation, with the emergency cooling system installed in the reeactor and the reactor operating, the system essentially lies dormant but ready to operate in the event a break occurs in the main cooling system piping. Should such an event take place, the main cooling system pressure drops below the accumulator charging pressure and check valves 59 establish direct communication between emergency water supply accumulators 58 and the reactor core. The emergency water thereupon flows through inlet 60 and riser 62 to manifold 64 mounted on the reactor deep beam structure 33. Upon entering the manifold, the emergency water flows to branch lines 66, and also directly from the manifold into tubes 116 and 118 which supply the water to multiple downcomers 120 and 122 mounted in the upper part of the reactor. A downcomer 120 or 122 is arranged to serve a single fuel assembly in the reactor and is connected at its lower end to a distributor 168 which channels the water to ducts bored in a cruciform shaped support base 170 mounted on the upper core plate 30. From there, the water flows downwardly into the plugs 44 located in the guide thimbles 38 and is discharged therefrom into the guide thimble. Since the walls of each guide thimble have holes spaced along their length, the water which is under a high pressure, is sprayed outwardly into direct contact with the fuel elements 36, thus generating steam for carrying away the core heat. Since the guide thimbles in the core are specifically chosen to help assure the spraying of emergency water against the fuel elements, uniform cooling of all fuel elements is thereby achieved. The steam generated by the above cooling finds its way from the core 29 through the upper part of the reactor and through the structural failure initiating the emergency.

In view of the above, it will be apparent that many modifications and varitions are possible in light of the above teachings. It therefore is to be understood that within the scope of the appended claims the invention may be practiced other than as specifically described.

What we claim as new and desire to secure by United States Letters Patent is:

1. An emergency cooling system for a nuclear reactor comprising:

a pressure vessel having a closure head secured in fluid-tight relationship therewith and including liquid supply and discharge ducts for circulating coolant through a core in the vessel, said core including upper and lower core plates having multiple fuel assemblies disposed therebetween which generate heat while undergoing a fission process; said multiple fuel assemblies including selected fuel assemblies containing fuel elements with guide thimbles interspersed therebetween and other fuel assemblies containing fuel elements and guide thimbles having control rods reciprocally movable therein, said control rods being the only control rods present in said nuclear reactor;

emergency coolant inlet piping connected at one end to coolant supply means containing emergency coolant under high pressure and its other end to a manifold mounted within the reactor vessel;

piping extending from the manifold to distributor means mounted on said upper core plate above only said selected fuel assemblies in the pressure vessel;

said distributor means including a support base mounted on said upper core plate surmounting each selected fuel assembly, and laterally extending emergency coolant passageways in said base;

means connecting each of said passageways with a corresponding guide thimble mounted in each said selected fuel assembly; and each of said corresponding guide thimbles in selected fuel assemblies having openings in the walls thereof, which openings are spaced along the guide thimble length and are located in a position to spray emergency coolant against the fuel elements in said selected fuel assemblies to absorb heat generated by said fuel elements.

2. The cooling system according to claim 1 including a coolant outlet for each selected fuel assembly;

a mixing device mounted on said distributor means and positioned in at least one fuel assembly outlet, said device having depending nozzles directed toward different quadrants in the assembly so that coolant flowing therethrough into the mixing device provides a mixed coolant having a temperature representative of average temperatures in the assembly; and thermocouple means in the outlet for sensing the temperature of the mixed coolant.

3. The cooling system according to claim 2 wherein the piping extending from the manifold to the distributor means comprises downcomer tubing; and wherein said thermocouple means comprises a thermocouple element mounted in selected downcomer tubings and having its tip terminating in each said assembly outlet for sensing the temperature of coolant discharged from the fuel assembly under normal operating conditions.

4. The cooling system according to claim 1 wherein the emergency coolant inlet piping comprises at least one inlet nozzle extending through a wall of the pressure vessel, and a riser connected at an angle to the nozzle and extending upwardly inside the pressure vessel for connection to the manifold, thereby providing an avenue for flow of coolant from emergency coolant supply means to the manifold.

5. The cooling system according to claim 4 wherein a mechanical seal is positioned at joints made by joined pipes between the riser and nozzle and at points made along the riser length, each of said seals comprising a piston in the riser having a surface in contact with depending lips on the pipe immediately thereabove, and a spring mounted in the riser having one end bearing against the piston to urge it at all times into contact with said lips.

6. The cooling system according to claim 1 wherein piping extending from the manifold includes branch lines, and downcomer tubings extending downwardly from said lines for connection to said distributor means surmounting each said selected fuel assembly.

7. The cooling system according to claim 1 wherein said distributor means further comprises a pipe section having axially extending ducts therein; and said support base comprises a yoke having radially-extending arms mounted on said upper core plate, said arms including said coolant passageways communicating with said ducts in the distribution means; and means interconnecting said yoke arms with said guide thimbles for supplying coolant thereto.

8. The cooling system according to claim 1 wherein a plug having a central bore is positioned in each of said guide thimbles in selected fuel assemblies and communicates at one end with said distributor means, and an opening near the other end of the plug for supplying coolant into the guide thimbles in which it is located; and holes in said guide thimbles for spraying said coolant against fuel elements in said selected fuel assemblies.

9. The cooling system according to claim 8 wherein the upper end of each plug is secured in said upper core plate.

* * * * *